(12) United States Patent
Nohara et al.

(10) Patent No.: US 7,678,014 B2
(45) Date of Patent: Mar. 16, 2010

(54) CONTROL APPARATUS FOR VEHICULAR POWER TRANSMITTING SYSTEM

(75) Inventors: Hideharu Nohara, Okazaki (JP); Toshinari Suzuki, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/320,519

(22) Filed: Jan. 28, 2009

(65) Prior Publication Data
US 2009/0203481 A1 Aug. 13, 2009

(30) Foreign Application Priority Data
Feb. 12, 2008 (JP) ............... 2008-030103

(51) Int. Cl.
| | | |
|---|---|---|
| H02P 17/00 | (2006.01) | |
| B60W 10/04 | (2006.01) | |
| B60W 10/10 | (2006.01) | |
| F16H 3/72 | (2006.01) | |
| F16H 37/06 | (2006.01) | |
| G06F 7/00 | (2006.01) | |
| G06F 17/00 | (2006.01) | |

(52) U.S. Cl. ............... 477/15; 475/5; 701/56; 701/62; 701/66; 903/945

(58) Field of Classification Search ............ 475/4, 475/5; 477/15, 35, 115; 701/55, 56, 62, 701/66; 903/945
See application file for complete search history.

(56) References Cited

U.S. PATENT DOCUMENTS 7,470,212 B2 * 12/2008 Inagaki et al. ............... 477/111

| | | | |
|---|---|---|---|
| 2005/0131612 A1* | 6/2005 | Noritaka et al. ............... | 701/51 |
| 2008/0064563 A1* | 3/2008 | Kobayashi et al. ............ | 477/34 |
| 2008/0064565 A1* | 3/2008 | Doi et al. ..................... | 477/75 |
| 2008/0161159 A1* | 7/2008 | Runde et al. ................ | 477/156 |
| 2009/0088290 A1* | 4/2009 | Tabata et al. ................. | 477/5 |
| 2009/0210121 A1* | 8/2009 | Tokura et al. ................. | 701/55 |

FOREIGN PATENT DOCUMENTS

| JP | A-06-313477 | 11/1994 |
|---|---|---|
| JP | A-07-259975 | 10/1995 |
| JP | A-2005-264762 | 9/2005 |

* cited by examiner

Primary Examiner—Tisha D Lewis
(74) Attorney, Agent, or Firm—Oliff & Berridge, PLC

(57) ABSTRACT

A control apparatus for a vehicular power transmitting system including an electrically controlled differential portion having an electric motor, and an automatic transmission portion, the control apparatus including shift control portion operable upon determination that a jump shift-down action of the automatic transmission portion directly to a target gear position while skipping at least one intermediate gear position should take place and upon inhibition of the jump shift-down action, to generate a shifting command to perform the jump shift-down action when total jump-shift-down-action time required for the jump shift-down action is shorter than total sequential-shift-down-operation time required for a sequential shift-down operation consisting of a shift-down action to each intermediate gear position and a shift-down action from the last intermediate gear position to the target gear position, and a shifting command to perform the sequential shift-down operation when the total jump-shift-down-action time is not shorter than the total sequential-shift-down-operation time.

4 Claims, 9 Drawing Sheets

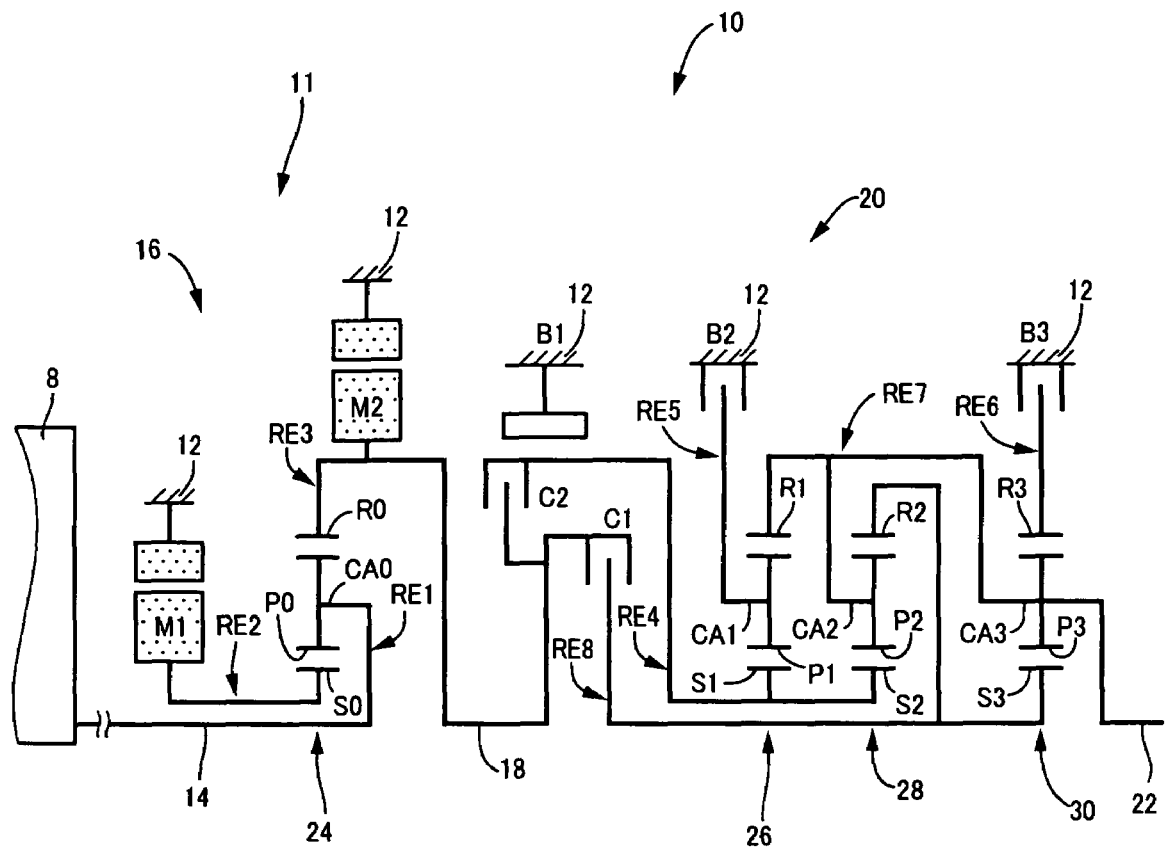

CONTROL APPARATUS FOR VEHICULAR POWER TRANSMITTING SYSTEM

CROSS REFERENCE TO RELATED APPLICATION

The present application claims priority from Japanese Patent Application No. 2008-030103, which was filed on Feb. 12, 2008, the disclosure of which is herein incorporated by reference in its entirety.

BACKGROUND OF THE INVENTION

1. Field of the Invention

The present invention relates in general to a control apparatus for a vehicular power transmitting system including an automatic transmission portion, and more particularly to techniques for improving a control response of shifting actions of the automatic transmission portion.

2. Discussion of Prior Art

There is known a power transmitting system suitable for hybrid vehicle, including an electrically controlled differential portion which has a first electric motor and a differential mechanism a differential state of which is controllable by controlling an operating state of the first electric motor, and further including a step-variable automatic transmission portion constituting a part of a power transmitting path, and a second electric motor connected to the power transmitting path. JP-2005-264762 A discloses an example of such a vehicular power transmitting system. A control apparatus for the vehicular power transmitting system disclosed in this publication is configured such that a rise of the rotating speed of an output shaft of the electrically controlled differential portion causes a rise of the operating speed of the first electric motor in the negative direction during a shift-down action of the automatic transmission portion, as is apparent from a collinear chart of the FIG. 3 in the above-identified publication. This phenomenon increases with a decrease of the operating speed of an engine. To prevent an excessive rise of the rotating speed of the first electric motor, there is provided a lower limit of the operating speed of the engine so that a shift-down action of the automatic transmission portion according to a shifting command during running of a vehicle by the engine in an engine-drive mode is inhibited until the operating speed of the engine which is lower than the above-indicated lower limit upon generation of the shifting command is raised to the lower limit. However, this aspect of the control apparatus is not described in the publication. When an accelerator pedal of the vehicle is depressed by a considerably large amount by an operator of the vehicle, the control apparatus may generate a shifting command to perform a jump or skipping shift-down action from the present gear position to a target gear position while skipping at least one intermediate gear position between the present gear position and the target gear position. Where this jump shift-down action according to the shifting command is inhibited due to the lower limit of the engine speed, the automatic transmission portion is controlled to perform a sequential or stepping shift-down operation wherein the automatic transmission portion is sequentially shifted from the present gear position to each of the at least one intermediate gear position, and from the lowest intermediate gear position to the target gear position.

The control apparatus for the vehicular power transmitting system disclosed in the above-identified publication permits the automatic transmission portion to be shifted down to the target gear position according to the shifting command to perform the jump shift-down action, while preventing an excessive rise of the operating speed of the first electric motor. It is noted that the operating speed of the engine is usually in the process of rising under a situation in which the jump shift-down command to perform the jump shift-down action is generated. In view of this tendency, it is considered that the automatic transmission portion can be shifted down to the target gear position at an earlier point of time where the jump shift-down action is performed after the engine speed is raised to the lower limit, than where the sequential shift-down operation is performed, particularly when the rate of rise of the engine speed is relatively high. This possibility is not described in the above-identified publication. Namely, the control apparatus disclosed in the publication is not configured to assure a high degree of control response of the jump shift-down actions under all situations in which the jump shift-down commands are generated.

SUMMARY OF THE INVENTION

The present invention was made in view of the background art described above. It is therefore an object of this invention to provide a control apparatus for a vehicular power transmitting system, which assures a high degree of shifting control response of the automatic transmission portion upon determination that a jump shift-down action of the automatic transmission portion should take place.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular power transmitting system including (a) an electrically controlled differential portion having a differential mechanism disposed between an engine and a drive wheel, and a differential-portion electric motor operatively connected to the differential mechanism, wherein a differential state of the differential portion is controllable by controlling an operating state of the differential-portion electric motor, and (b) a step-variable automatic transmission portion which constitutes a part of a power transmitting path between the engine and the drive wheel, the control apparatus comprising:

a shifting-action determining portion configured to determine whether a shifting action of the automatic transmission portion should take place;

a shifting inhibiting portion configured to inhibit a shift-down action of the automatic transmission portion when an operating speed of the engine is lower than a predetermined lower limit;

a shifting-time comparing portion operable when the shifting-action determining portion determines that a jump shift-down action of the automatic transmission portion from a present gear position to a target gear position while skipping at least one intermediate gear position therebetween should take place, and when the jump shift-down action is inhibited by the shifting inhibiting portion, the shifting-time comparing portion being configured to compare a total sequential-shift-down-operation time required for a sequential shift-down operation consisting a shift-down action from the present gear position to each of the at least one intermediate gear position and a last shift-down action from the last intermediate gear position to the target gear position, with a total jump-shift-down-action time required for the jump shift-down action to be performed after the inhibition of the jump shift-down action is canceled; and a shift control portion operable when the shifting-action determining portion determines that the jump shift-down action should take place and when the jump shift-down action is inhibited, the shift control portion being configured to generate a shifting command to perform the jump shift-down action when the total jump-shift-down-action time is shorter than the total sequential-shift-down-operation time, and a shifting command to perform the sequential shift-down operation when the total jump-shift-down-action time is not shorter than the total sequential-shift-down-operation time.

The control apparatus according to the above-described mode (1) of the present invention comprises (i) the shifting-time comparing portion, which is operable upon determination that the jump shift-down action should take place, and upon inhibition of the jump shift-down action, to compare the total sequential-shift-down-operation time required for the sequential shift-down operation with the total jump-shift-down-action time required for the jump shift-down action to be performed after the inhibition of the jump shift-down action is canceled, and (ii) the shift control portion, which is operable upon the determination that the jump shift-down action should take place and upon the inhibition of the jump shift-down action, to generate the shifting command to perform the jump shift-down action when the total jump-shift-down-action time is shorter than the total sequential-shift-down-operation time, and the shifting command to perform the sequential shift-down operation when the total jump-shift-down-action time is not shorter than the total sequential-shift-down-operation time. Thus, the present control apparatus is configured such that one of the sequential shift-down operation and the jump shift-down action which is completed at an earlier point of time is performed, when it is determined that the jump shift-down action should take place and when this jump shift-down action is initially inhibited. Accordingly, the present control apparatus assures a higher degree of shifting control response of the automatic transmission portion upon determination that the jump shift-down action of the automatic transmission portion should take place, than in the prior art shifting control wherein the sequential shift-down operation is always performed when the jump shift-down action is inhibited.

(2) The control apparatus according to the above-described mode (1) of the invention, wherein the total sequential-shift-down-operation time is a length of time from a moment of determination that the jump shift-down action should take place, to a moment at which the sequential shift-down operation is completed, while the total jump-shift-down-action time is a length of time from the above-indicated moment of determination to a moment at which the jump shift-down action is completed.

In the above-described mode (2) of the invention, the shifting-time comparing portion can determine which one of the sequential shift-down operation and the jump shift-down action is completed at an earlier point of time, by comparing the total sequential-shift-down-operation time and the total jump shift-down-action time.

(3) The control apparatus according to the above-described mode (1) or (2) of the invention, further comprising a shifting-inhibiting-time estimating portion operable when the shifting-action determining portion determines that the jump shift-down action should take place and when the jump shift-down action is inhibited by the shifting inhibiting portion, the shifting-inhibiting-time estimating portion being configured to estimate, on a basis of a change of an operating speed of the engine, a jump-shift-down-action inhibiting time from a moment of determination that the jump shift-down action should take place, to a moment at which inhibition of the jump shift-down action by the shifting inhibiting portion is canceled, and wherein the shifting-time comparing portion determines a sum of the jump-shift-down-action inhibiting time and a length of time from a moment of initiation of the jump shift-down action to a moment of completion of the jump shift-down action, as the total jump-shift-down-action time.

In the above-described mode (3) of this invention wherein the total jump-shift-down-action time is determined by the shifting-time comparing portion on the basis of the jump-shift-down-action inhibiting time, which is estimated by the shifting-inhibiting-time estimating portion on the basis of a change of the engine speed, the total jump-shift-down-action time can be easily obtained by detecting the operating speed of the engine from time to time.

(4) The control apparatus according to any one of the above-described modes (1)-(3), wherein the predetermined lower limit of the operating speed of the engine is determined to prevent a rise of an absolute value of the operating speed of the differential-portion electric motor above a permissible highest value, such that the lower limit increases with an increase of a speed ratio of the gear position to be established by and after the shifting action to be inhibited by the shifting-action inhibiting portion.

In the above-described mode (4) of this invention, the lower limit of the operating speed of the differential-portion electric motor is determined to prevent a rise of the operating speed of the engine such that the lower limit increases with the increase of the speed ratio of the gear position to be established after the shifting action to be inhibited, so that the durability of the differential-portion electric motor can be maintained while preventing an excessive rise of the operating speed of the differential-portion electric motor due to the shift-down action of the automatic transmission portion.

(5) The control apparatus according to any one of the above-described modes (1)-(4), the differential mechanism is a planetary gear set having three elements consisting of a carrier connected to the engine, a sun gear connected to the differential-portion electric motor, and a ring gear connected to the automatic transmission portion.

In the above-described mode (5) of the present invention wherein the differential mechanism is constituted by one planetary gear set, the axial dimension of the differential mechanism can be reduced, and the differential mechanism can be made simple in construction.

(6) The control apparatus according to the above-described mode (5), wherein the planetary gear set is a single-pinion type planetary gear set.

In the above-described mode (6) of the invention wherein the differential mechanism is constituted by one planetary gear set of a single-pinion type, the axial dimension of the differential mechanism can be reduced, and the differential mechanism can be made simple in construction.

(7) The control apparatus according to any one of the above-described modes (1)-(6), the vehicular power transmitting system has an overall speed ratio determined by a speed ratio of the automatic transmission portion and a speed ratio of the electrically controlled differential portion.

In the above-described mode (7) of the present invention, the vehicular power transmitting system can provide a drive force over a wide range of speed ratio, owing to a step-variable change of the speed ratio of the automatic transmission portion.

(8) The control apparatus according to any one of the above-described modes (1)-(7), therein the vehicular power transmitting system further includes another electric motor which is disposed in a power transmitting path between said electrically controlled differential portion and said drive wheel and which functions as a drive power source for driving said drive wheel.

BRIEF DESCRIPTION OF THE DRAWINGS

The above and other objects, features, advantages, and technical and industrial significance of this invention will be better understood by reading the following detailed description of a preferred embodiment of the present invention, when considered in connection with the accompanying drawings, in which:

FIG. 1 is a schematic view showing an arrangement of a power transmitting system of a hybrid vehicle, which is controlled by a control apparatus constructed according to the principle of this invention;

FIG. 2 is a table indicating shifting actions of an automatic transmission portion provided in the power transmitting system of FIG. 1, in relation to different combinations of operating states of hydraulically operated frictional coupling devices to effect the respective shifting actions;

DETAILED DESCRIPTION OF THE PREFERRED EMBODIMENT

Figure 7:
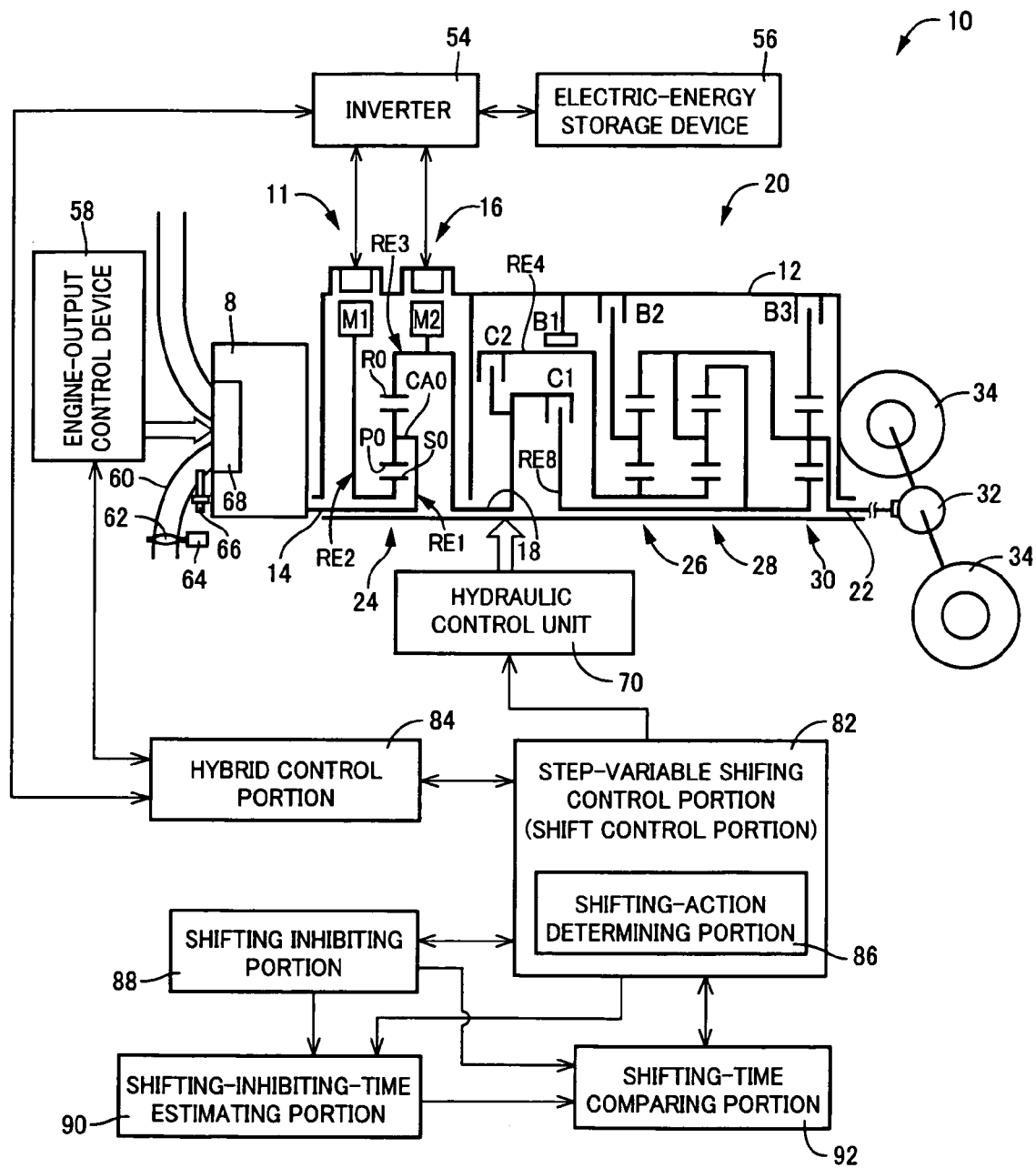
FIG. 7 is a functional block diagram illustrating major control functions of the electronic control device of FIG. 4.

Referring first to the schematic view of FIG. 1, there is shown a power transmitting system 10 for a hybrid vehicle, which is controlled by a control apparatus constructed according to one embodiment of this invention. As shown in FIG. 1, the power transmitting system 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of an automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 functioning as a stationary member attached to a body of the vehicle, and are connected in series with each other. This power transmitting system 10 is suitably used for a longitudinal FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present power transmitting system 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the power transmitting system 10, which is constructed symmetrically with respect to its axis, is omitted in FIG. 1.

The differential portion 11, which functions as an electrically controlled differential portion, includes: a differential-portion electric motor in the form of a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a planetary gear set 24 of a single pinion type having a gear ratio ρ1 of about 0.418, for example. The planetary gear set 24 has rotary elements consisting of: a sun gear S0, a planetary gear P0; a carrier CA0 supporting the planetary gear P0 such that the planetary gear P0 is rotatable about its axis and about the axis of the sun gear S0; and a ring gear R0 meshing with the sun gear S0 through the planetary gear P0. Where the numbers of teeth of the sun gear S0 and the ring gear R0 are represented by ZS0 and ZR0, respectively, the above-indicated gear ratio ρ0 is represented by ZS0/ZR0.

In the power distributing mechanism 16, the carrier CA0 is connected to the input shaft 14, that is, to the engine 8, and the sun gear S0 is connected to the first electric motor M1, while the ring gear R0 is connected to the power transmitting member 18. The power distributing mechanism 16 constructed as described above is operated in a differential state in which three elements of the planetary gear set 24 consisting of the sun gear S0, carrier CA0 and ring gear R0 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Namely, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max. Thus, the differential portion 11 functions as a continuously-variable power transmitting system wherein a differential state between the rotating speed of the input shaft 14 and the rotating speed of the power transmitting member 18 functioning as the output shaft of the differential portion 11 is controlled by controlling the operating states of the first electric motor M1, second electric motor M2 and engine 8 that are operatively connected to the power distributing mechanism 16.

The automatic transmission portion 20 constitutes a part of a power transmitting path between the differential portion 11 and the drive wheels 34. The automatic transmission portion 20 includes a single-pinion type first planetary gear set 26, a single-pinion type second planetary gear set 28 and a single-pinion type third planetary gear set 30. Thus, the automatic transmission portion 20 is a multiple-step transmission of a planetary gear type. The first planetary gear set 26 has: a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a gear ratio ρ1 of about 0.562. The second planetary gear set 28 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a gear ratio ρ2 of about 0.425. The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a gear ratio ρ3 of about 0.421. Where the numbers of teeth of the first sun gear S1, first ring gear R1, second sun gear S2, second ring gear R2, third sun gear S3 and third ring gear R3 are represented by ZS1, ZR1, ZS2, ZR2, ZS3 and ZR3, respectively, the above-indicated gear ratios ρ1, ρ2 and ρ3 are represented by ZS1/ZR1. ZS2/ZR2, and ZS3/ZR3, respectively.

In the automatic transmission portion 20, the first sun gear S1 and the second sun gear S2 are integrally fixed to each other as a unit, selectively connected to the power transmitting member 18 through a first clutch C1, and selectively fixed to the transmission casing 12 through a first brake B1. The first carrier CA1 is selectively fixed to the transmission casing 12 through a second brake B2, and the third ring gear R3 is selectively fixed to the transmission casing 12 through a third brake B3. The first ring gear R1, second carrier CA2 and third carrier CA3 are integrally fixed to each other and fixed to the output shaft 22. The second ring gear R2 and the third sun gear S3 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 20 (power transmitting path between the differential portion 11 or power transmitting member 18 and the drive wheels 34), to a selected one of a power transmitting state in which a vehicle drive force can be transmitted through the power transmitting path, and a power cut-off state (non-power-transmitting state) in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the power transmitting system 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the power transmitting system 10 (rotating speed $N_{IN}$ of the input shaft 14/rotating speed $N_{OUT}$ of the output shaft 22) is continuously variable. Thus, the power transmitting system 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the power transmitting system 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the power transmitting system 10 is variable in step as geometric series. Thus, the power transmitting system 10 is operable like a step-variable transmission.

When the speed ratio γ0 of the differential portion 11 is held constant at 1, for example, the overall speed ratio γT of the power transmitting system 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the power transmitting system 10 is controlled to be about 0.7.

Figure 3:
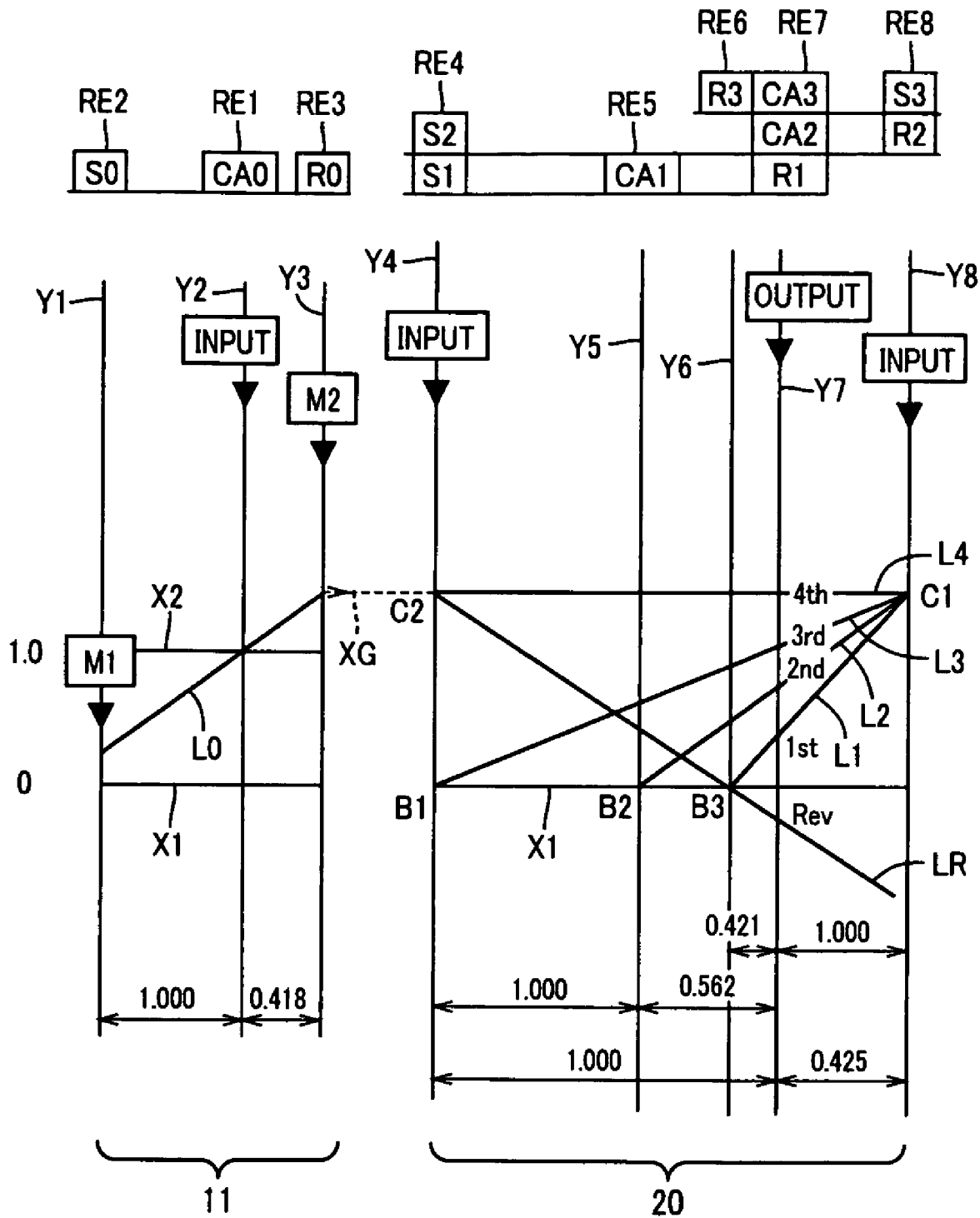
FIG. 3 is a collinear chart indicating relative rotating speeds of rotary elements of an electrically controlled differential portion and the automatic transmission portion of the power transmitting system of FIG. 1.

The collinear chart of FIG. 3 indicates, by straight lines, a relationship among the rotating speeds of the rotary elements in each of the gear positions of the power transmitting system 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the sun gear S0, a first rotary element (first element) RE1 in the form of the carrier CA0, and a third rotary element (third element) RE3 in the form of the ring gear R0. The distances between the adjacent ones of the vertical lines Y1, Y2 and Y3 are determined by the gear ratio ρ0 of the planetary gear set 24. That is, the distance between the vertical lines Y1 and Y2 corresponds to "1", while the distance between the vertical lines Y2 and Y3 corresponds to the gear ratio ρ0. Further, five vertical lines Y4, Y5, Y6, Y7 and Y8 corresponding to the transmission portion 20 respectively represent the relative rotating speeds of a fourth rotary element (fourth element) RE4 in the form of the first and second sun gears S1, S2 integrally fixed to each other, a fifth rotary element (fifth element) RE5 in the form of the first carrier CA1, a sixth rotary element (sixth element) RE6 in the form of the third ring gear R3, a seventh rotary element (seventh element) RE7 in the form of the first ring gear R1 and second and third carriers CA2, CA3 that are integrally fixed to each other, and an eighth rotary element (eighth element) RE8 in the form of the second ring gear R2 and third sun gear S3 integrally fixed to each other. The distances between the adjacent ones of the vertical lines are determined by the gear ratios ρ1, ρ2 and ρ3 of the first, second and third planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the first, second and third planetary gear sets 26, 28, 30 corresponds to "1", while the distance between the carrier and ring gear of each planetary gear set 26, 28, corresponds to the gear ratio ρ.

Referring to the collinear chart of FIG. 3, the power distributing mechanism 16 (differential portion 11) of the power transmitting system 10 is arranged such that the first rotary element RE1 (carrier CA0) of the planetary gear set 24 is integrally fixed to the input shaft 14 (engine 8), and the second rotary element RE2 is fixed to the first electric motor M1, while the third rotary element RE3 (ring gear R0) is fixed to the power transmitting member 18 and the second electric motor M2, so that a rotary motion of the input shaft 14 is transmitted (input) to the automatic transmission portion 20 through the power transmitting member 18. A relationship between the rotating speeds of the sun gear S0 and the ring gear R0 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the sun gear S0, that is, the rotating speed of the first electric motor M1, which is represented by a point of intersection between the straight line L0 and the vertical line Y1, is raised or lowered by controlling the engine speed $N_E$, so that the rotating speed of the carrier CA0 represented by a point of intersection between the straight line L0 and the vertical line Y2, if the rotating speed of the ring gear R0 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the sun gear S0 is made equal to the engine speed $N_E$, the straight line L0 is aligned with the horizontal line X2, so that the ring gear R0, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the sun gear S0 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
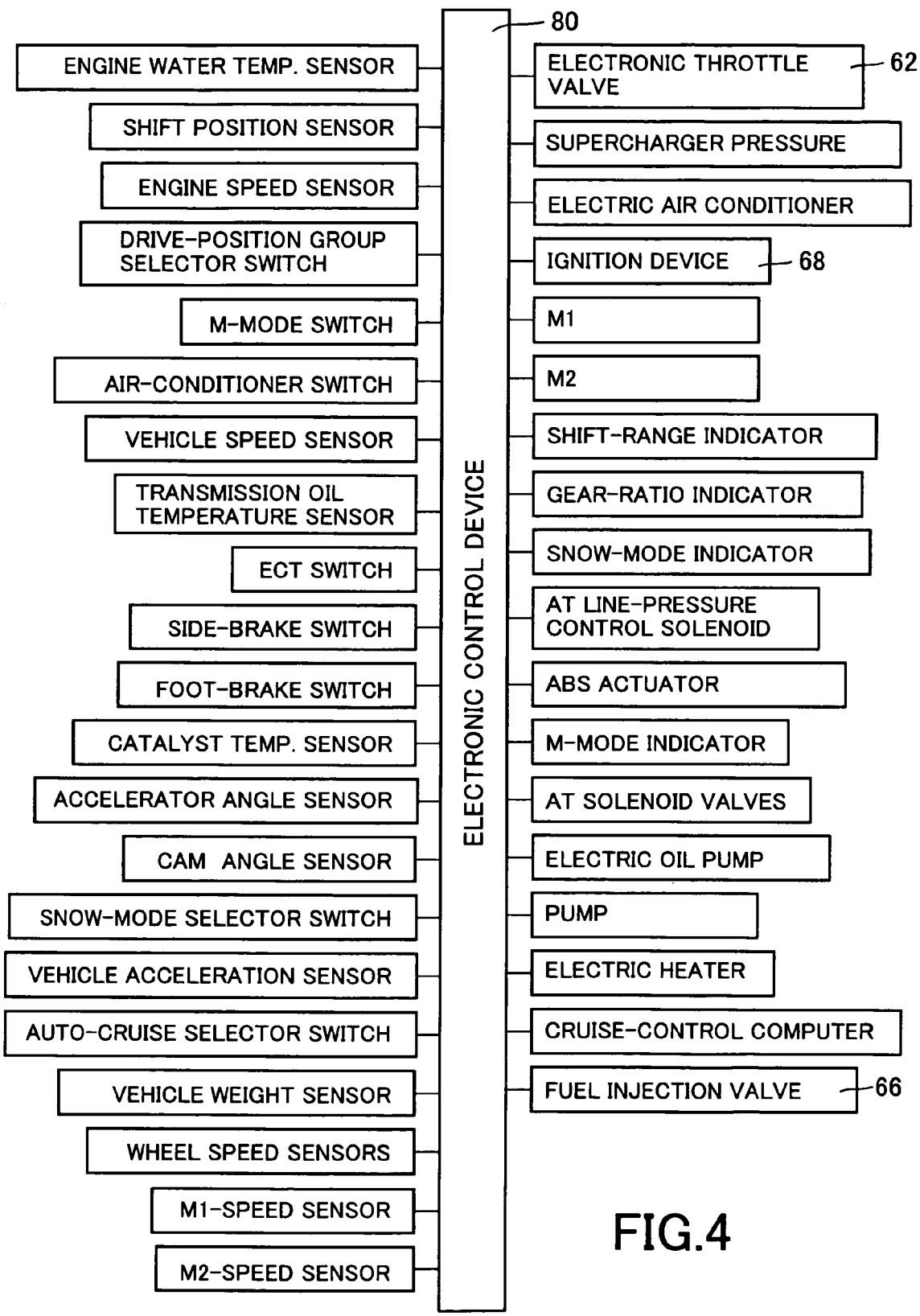
FIG. 4 is a view indicating input and output signals of an electronic control device serving as the control apparatus according to one embodiment of this invention to control the power transmitting system of FIG. 1.

FIG. 4 illustrates signals received by an electronic control device 80 provided to control the power transmitting system 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions (shift positions) $P_{SH}$ of a manually operable shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the power transmitting system 10; a signal indicative of an M mode (manual shifting mode); a signal indicative of an operated state of an air conditioner; a signal indicative of a vehicle speed V corresponding to the rotating speed $N_{OUT}$ of the output shaft 22; a signal indicative of a temperature $T_{OIL}$ of a working fluid or oil of the automatic transmission portion 20; a signal indicative of an operated state of a side brake; a signal indicative of an operated state of a foot brake pedal; a signal indicative of a temperature of a catalyst; a signal indicative of a required amount of an output of the vehicle in the form of an amount of operation (an angle of operation) $A_{CC}$ of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$, where appropriate); a signal indicative of a rotating speed $N_{M2}$ of the second electric motor M2 (hereinafter referred to as "second electric motor speed $N_{M2}$, where appropriate); and a signal indicative of an amount of electric energy SOC stored in an electric-energy storage device 56 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an anti-lock brake actuator (ABS actuator); a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
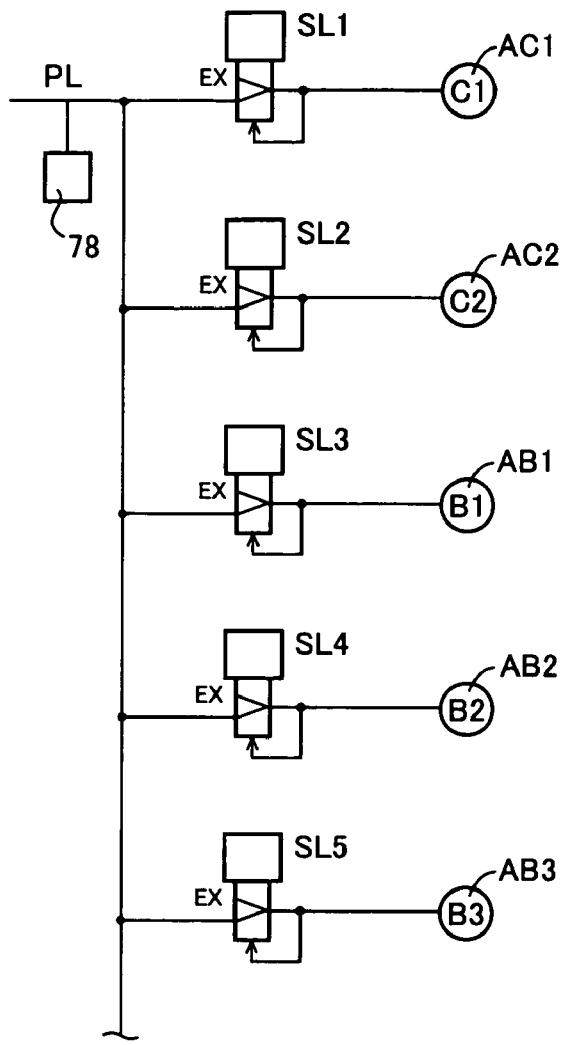
FIG. 5 is a circuit diagram showing hydraulic actuators (hydraulic cylinders) provided in a hydraulic control unit, for operating clutches C and brakes B incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
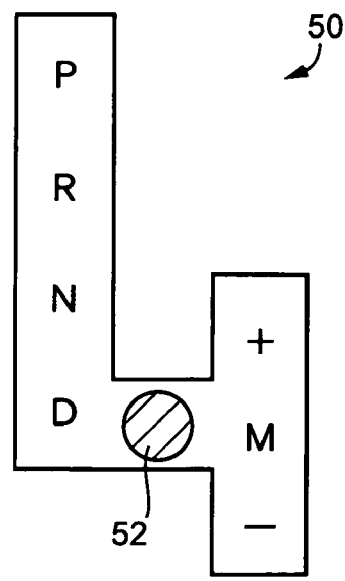
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of a parking position P for placing the power transmitting system 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the power transmitting system 10 in the neutral state; an automatic forward-drive shifting position (forward-drive position) D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power cut-off state established by releasing both of the clutches C1 and C2, as shown in the table of FIG. 2. In the drive positions R, D, M, the power transmitting path in the automatic transmission portion 20 is in the power transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Referring to the functional block diagram of FIG. 7, the electronic control device 80 includes a step-variable shifting control portion 82, a hybrid control portion 84, a shifting inhibiting portion 88, a shifting-inhibiting-time estimating portion 90 and a shifting-time comparing portion 92. The step-variable shifting control portion 82 functions as a shift control portion configured to control the shifting actions of the automatic transmission portion 20. Described in detail, the step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual vehicle running speed V and the actual output torque Tour of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8. Since the output torque Tour of the automatic transmission portion 20 increases with an increase of the operation amount $A_{CC}$ of the accelerator pedal, the output torque $T_{OUT}$ taken along the vertical axis of the shifting boundary line map of FIG. 8 may be replaced by the operation amount $A_{CC}$ of the accelerator pedal.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Figure 9:
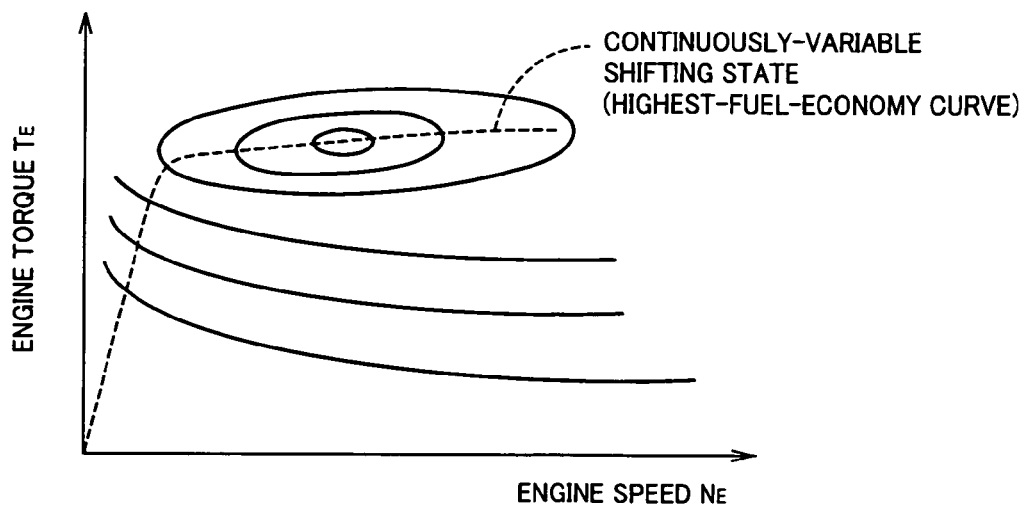
FIG. 9 is a view indicting a highest-fuel-economy curve of the engine shown in FIG. 1.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the power transmitting system 10, so that the engine 8 is operated according to a stored highest-fuel-economy curve (fuel-economy map or relation) indicated by broken line in FIG. 9 The target value of the overall speed ratio γT of the power transmitting system 10 permits the engine torque $T_E$ and speed $N_E$ to be controlled so that the engine 8 provides an output necessary for obtaining the target vehicle output (target total vehicle output or required vehicle drive force). The highest fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the output of the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34. Thus, the vehicle can be driven in a selected one of an engine-drive mode in which the engine 8 is used as the vehicle drive power source; an engine-and-motor-drive mode in which both the engine 8 and the second electric motor M2 are used as the vehicle drive power source; and a motor-drive mode in which the second electric motor M2 is used as the vehicle drive power source, with the engine 8 being held at rest.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 functions as regeneration control means for operating the second electric motor M2 as the electric generator with a kinetic energy of the running vehicle, that is, with a drive force transmitted from the drive wheels 34 toward the engine 8, during coasting of the vehicle with the accelerator pedal placed in the non-operated position, or during brake application to the vehicle with hydraulically operated wheel brakes for the drive wheels 34. An electric energy generated by the second electric motor M2 is stored in the electric-energy storage device 56 through the inverter 54, for improving the fuel economy of the vehicle. The amount of electric energy to be generated by the second electric motor M2 is determined on the basis of the electric energy amount SOC stored in the electric-energy storage device 56, and a desired proportion of a regenerative braking force produced by the second electric motor M2 operated as the electric generator, with respect to a total braking force which corresponds to the operating amount of a brake pedal and which consists of the regenerative braking force and a hydraulic braking force produced by the hydraulically operated wheel brakes.

Figure 10:
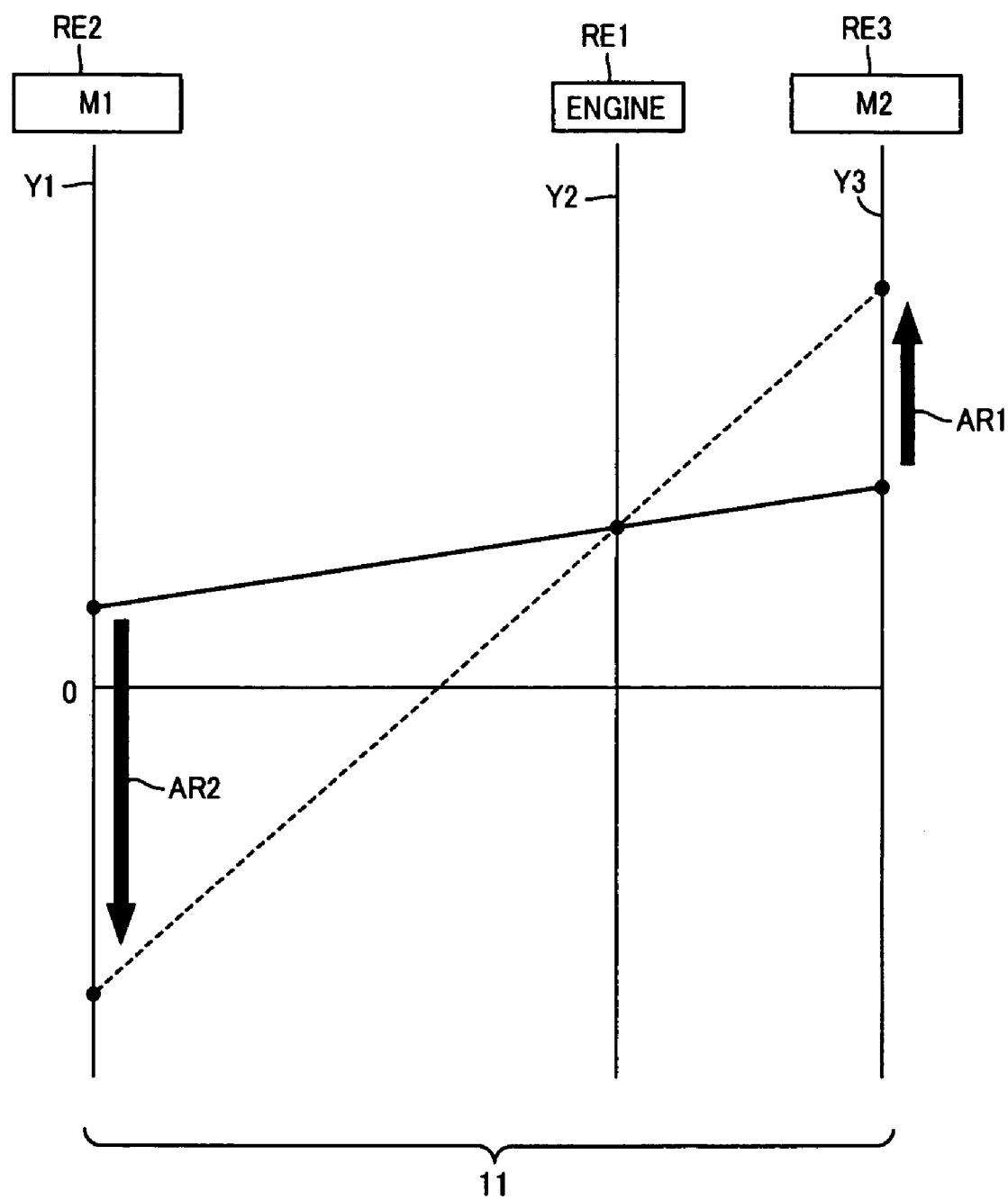
FIG. 10 is a collinear chart indicating the relative rotating speeds of the differential portion of the power transmitting system of FIG. 1, wherein the vertical straight lines Y1-Y3 correspond to those of FIG. 3.

As is apparent from the collinear chart of FIG. 10 corresponding to the electrically controlled differential portion 11, a shift-down action of the automatic transmission portion 20 causes an increase of the rotating speed of the third rotary element RE3 in the positive direction, as indicated by an arrow AR1, and an increase of the first electric motor speed $N_{M1}$ in the negative direction, as indicated by an arrow AR2, such that the first electric motor speed $N_{M1}$ increases with the increase of the rotating speed of the third rotary element RE3 and a decrease of the engine speed $N_E$. For improving the durability of the first electric motor M1, a permissible highest speed $N1_{M1}$ of the first electric motor M1 obtained by experimentation is set to prevent an excessive rise of the first electric motor speed $N_{M1}$. For example, the permissible highest speed $N1_{M1}$ of the first electric motor M1 in the negative direction is set to be 6,950 rpm. Accordingly, a jump or skipping shift-down action of the automatic transmission portion 20 from the present gear position to the target gear position while skipping at least one intermediate gear position between the present and target gear positions is inhibited to present a rise of the first electric motor speed $N_{M1}$ beyond the permissible highest speed $N1_{M1}$ in the negative direction when it is determined that the jump shift-down action causes a considerable increase of the rotating speed of the third rotary element RE3 which results in the rise of the first electric motor speed $N_{M1}$ beyond the permissible highest speed $N1_{M1}$ at the particular engine speed $N_E$. The control apparatus in the form of the electronic control device 80 according to the present embodiment of the invention is configured to control such a jump shift-down action of the automatic transmission portion 20 under such condition of the power transmitting system 10, so as to establish the target gear position of the jump shift-down action at an earliest point of time, namely, in a length of time as short as possible. This aspect of control of the jump shift-down action by the electronic control device 80 will be described in detail.

Referring back to the functional block diagram of FIG. 7, the step-variable shifting control portion (shift control portion) 82 includes a shifting-action determining portion 86 configured to determine whether the automatic transmission portion 20 should be shifted from the present gear position to another gear position. The shifting-action determining portion 86 stores therein the shifting boundary line map indicated in FIG. 8 by way of example, and makes the determination as to whether a shifting action of the automatic transmission portion 20 should take place, on the basis of the actual vehicle speed V and the operation amount $A_{CC}$ of the accelerator pedal, and according to the shifting boundary line map. When the accelerator pedal is abruptly depressed to rapidly increase the operation amount $A_{CC}$ at the present particular vehicle speed V, from a point "a" to a point "b" as indicated by an arrow-headed solid line A in FIG. 8, the shifting-action determining portion 86 determines that the jump shift-down action of the automatic transmission portion 20 from the fourth gear position to the second gear position should take place.

The shifting inhibiting portion 88 is configured to determine whether the engine speed $N_E$ is lower than a predetermined lower limit $N1_E$, and to inhibit a shift-down action of the automatic transmission portion 20 when it is determined that the engine speed NE is lower than the lower limit $N1_E$. The lower limit $N1_E$ is a threshold value below which the shift-down action is inhibited to prevent an excessive rise of the first electric motor speed $N_{M1}$ in the process of the shift-down action. The lower limit $N1_E$ is obtained by experimentation for each of the target gear positions to be established by and after the shift-down actions (including jump shift-down actions) of the automatic transmission portion 20, and is stored in the shifting inhibiting portion 88. The lower limit values $N1_E$ for the shift-down actions from the same gear position to the different target gear positions are determined to prevent a rise of the absolute value of the operating speed $N_{M1}$ of the first electric motor M1 above the permissible highest value $N1_{M1}$, such that the lower limit values $N1_E$ increase with an increase of the speed ratio of the target gear positions. For example, the lower limit value $N1_E$ for the jump shift-down action from the fourth gear position to the target second gear position is higher than that for the jump shift-down action from the fourth gear position to the target third gear position. Therefore, there is a case wherein the engine speed $N_E$ is lower than the comparatively high lower limit value $N1_E$ for the jump shift-down action to the second gear position but is not lower than the comparatively low lower limit value $N1_E$ for the jump shift-down action to the third gear position. In this case, the shifting inhibiting portion 88 inhibits the jump shift-down action from the fourth gear position to the second gear position, but permits the shift-down action from the fourth gear position to the third gear position. Preferably, the shifting inhibiting portion 88 is configured to make the determination as to whether the engine speed $N_E$ at the moment of determination by the shifting-action determining portion 86 that a shift-down action of the automatic transmission portion 20 should take place is lower than the lower limit $N1_E$ for that specific shift-down action, and to inhibit the specific shift-down action when the engine speed $N_E$ is lower than the lower limit $N1_E$ in question.

The shifting-inhibiting-time estimating portion 90 is configured to estimate a jump-shift-down-action inhibiting time $T2_A$ when the shifting-action determining portion 86 determines that the jump shift-down action should take place, and when the shifting inhibiting portion 88 determines that this jump shift-down action should be inhibited. The jump-shift-down-action inhibiting time $T2_A$ is a length of time from the moment of determination of the jump shift-down action to a moment at which the inhibition of the jump shift-down action by the shifting inhibiting portion 88 should be released or canceled. The shifting-inhibiting-time estimating portion 90 determines the jump-shift-down-action inhibiting time $T2_A$ on the basis of a change of the engine speed $N_E$, more precisely, on the basis of a rate of change $A_E$ of the engine speed $N_E$. Described in detail, the shifting-inhibiting-time estimating portion 92 detects from time to time the engine speed $N_E$ to determine the rate of change $A_E$ of the engine speed $N_E$, and calculates, as the jump-shift-down-action inhibiting time $T2_A$, an estimated length of time to a moment at which the engine speed $N_E$ is raised at the determined rate of change $A_E$ to the lower limit $N1_E$ corresponding to the target gear position to be established by the jump shift-down action in question. The jump-shift-down-action inhibiting time $T2_A$ is considered to be zero when the jump shift-down action is not inhibited.

The shifting inhibiting portion 88 may inhibit also a sequential or stepping shift-down operation of the automatic transmission 20 to the target gear position of a jump shift-down action determined by the shifting-action determining portion 86, when this determination is made while the engine speed $N_E$ is considerably low. The sequential shift-down operation consists of a shift-down action from the present gear position to each of the at least one intermediate gear position and a last shift-down action from the last intermediate gear position to the target gear position. The shifting-inhibiting-time estimating portion 90 is also configured to estimate a sequential-shift-down-operation inhibiting time $T1_A$ when the shifting-action determining portion 86 determines that the jump shift-down action should take place, and when the shifting inhibiting portion 88 determines that the corresponding sequential shift-down operation should be inhibited. The sequential-shift-down-operation inhibiting time $T1_A$ is a length of time to the moment of determination of the jump shift-down action to a moment at which the inhibition of the sequential shift-down operation by the shifting inhibiting portion 88 should be released or canceled. Like the jump-shift-down-action inhibiting time $T2_A$, the sequential-shift-down-operation inhibiting time $T1_A$ is determined by the shifting-inhibiting-time estimating portion 90 on the basis of the rate of change $A_E$ of the engine speed $N_E$. The inhibition of the sequential shift-down operation by the shifting inhibiting portion 88 is released or canceled when the engine speed $N_E$ has been raised to the lower limit value $N1_E$ corresponding to the target gear position to be established by the first shift-down action (indicated in FIG. 12) of the sequential shift-down operation. That is, the first shift-down action of the sequential shift-down operation should be permitted when the engine speed $N_E$ has been raised to the lower limit value $N1_E$ corresponding to the target gear position of the first shift-down action. The sequential-shift-down-operation inhibiting time $T1_A$ is considered to be zero when the sequential shift-down operation is not inhibited.

The shifting-time comparing portion 92 is operated upon determination by the shifting-action determining portion 86 that a jump shift-down action of the automatic transmission portion 20 should take place and upon inhibition of the jump shift-down action by the shifting inhibiting portion 88. The shifting-time comparing portion 92 is configured to compare a total sequential-shift-down-operation time $T1_T$ and a total jump-shift-down-action time $T2_T$ with each other. The total sequential-shift-down-operation time $T1_T$ is a length of time up to a moment at which the sequential shift-down operation to establish the target gear position of the jump shift-down action is considered to be completed, while the total jump-shift-down-action time $T2_T$ is a length of time up to a moment at which the jump shift-down action initiated after the inhibition of the jump shift-down action by the shifting inhibiting portion 88 is canceled is considered to be completed. In other words, the total sequential-shift-down-operation time $T1_T$ is a length of time up from the moment of determination that the jump shift-down action should take place, to the moment at which the sequential shift-down operation is considered to be completed, while the total jump-shift-down-action time $T2_T$ is a length of time from the moment of determination that the jump shift-down action should take place up to the moment at which the jump shift-down action initiated after the inhibition is canceled is considered to be completed. The total sequential-shift-down-operation time $T1_T$ is a sum of the above-indicated sequential-shift-down-operation inhibiting time $T1_A$ estimated by the shifting-inhibiting-time estimating portion 90, and a required net sequential-shift-down-operation time $T1_{EX}$, while the total jump-shift-down-action time $T2_T$ is a sum of the above-indicated jump-shift-down-action inhibiting time $T2_A$ estimated by the shifting-inhibiting-time estimating portion 90, and a required net jump-shift-down-action time $T2_{EX}$. The required net sequential-shift-down-operation time $T1_{EX}$ is a length of time from the moment of initiation of the sequential shift-down operation to the moment of termination or completion of the sequential shift-down operation, while the required net jump-shift-down-action time $T2_{EX}$ is a length of time from the moment of initiation of the jump shift-down action to the moment of termination or completion of the jump shift-down action. The required net sequential-shift-down-operation time $T1_{EX}$ and the required net jump-shift-down-action time $T2_{EX}$ are obtained by experimentation for each of the different shift-down actions of the automatic transmission portion 20, and are stored as a net-shifting-time map in the shifting-time comparing portion 92, in relation to the different shift-down actions. Upon determination of the specific jump shift-down action of the automatic transmission portion 20 by the shifting-action determining portion 86, the shifting-time comparing portion 92 determines the required net sequential-shift-down-operation time $T1_{EX}$ and the required net jump-shift-down-action time $T2_{EX}$, on the basis of the specific jump shift-down action and according to the net-shifting-time map. Then, the shifting-time comparing portion 82 adds the sequential-shift-down-operation inhibiting time $T1_A$ estimated by the shifting-inhibiting-time estimating portion 90 to the determined required net sequential-shift-down-operation time $T1_{EX}$ to obtain the total sequential-shift-down-operation time $T1_T$, and adds the jump-shift-down-action inhibiting time $T2_A$ estimated by the shifting-inhibiting-time estimating portion 90 to the determined required net jump-shift-down-action time $T2_{EX}$ to obtained the total jump-shift-down-action time $T2_T$.

The shifting-time comparing portion 92 applies its output signal indicative of a result of its comparison of the total sequential-shift-down-operation time $T1_T$ and the total jump-shift-down-action time $T2_T$, to the step-variable shifting control portion 82. The output signal of the shifting-time comparing portion 92 indicates whether the sequential-shift-down-operation time $T1_T$ is equal to or shorter than the total jump-shift-down-action time $T2_T$, or not.

If the step-variable shifting control portion (shift control portion) 82 is informed by the shifting-time comparing portion 92 that the total jump-shift-down-action time $T2_T$ is shorter than the total sequential-shift-down-operation time $T1_T$, upon determination by the shifting-action determining portion 86 that the jump shift-down action should take place and upon inhibition of this jump shift-down action by the shifting inhibiting portion 88, the step-variable shifting control portion 82 applies a shifting command to the hydraulic control unit 70 to perform the jump shift-down action after the inhibition of the jump shift-down action is canceled or released.

If the step-variable shifting control portion (shift control portion) 82 is informed by the shifting-time comparing portion 92 that the total sequential-shift-down-operation time $T1_T$ is equal to or shorter than the total jump-shift-down-action time $T2_T$, upon determination by the shifting-action determining portion 86 that the jump shift-down action should take place and upon inhibition of this jump shift-down action by the shifting inhibiting portion 88, the step-variable shifting control portion 82 commands the hydraulic control unit 70 to perform the sequential shift-down operation to eventually establish the target gear position of the jump shift-down action. The sequential shift-down operation consisting of the first shift-down action to the single intermediate gear position and the second and last shift-down action from the intermediate gear position to the target gear position will be described in detail, by way of example. Initially, the step-variable shifting control portion 82 applies a shifting command to the hydraulic control unit 70 to perform the first shift-down action, provided the first shift-down action is not inhibited. After the first shift-down action is completed, the step-variable shifting control portion 82 applies a shifting command to the hydraulic control unit 70 to perform the second and last shift-down action, provided the second shift-down action is not inhibited. Thus, the sequential shift-down operation consisting of the sequential or successive first and second shift-down actions is performed when the total sequential-shift-down-operation time $T1_T$ is longer than the total jump-shift-down-action time $T2_T$.

Referring next to the flow chart of FIG. 11, there will be described the control routine executed by the electronic control device 80 to control the automatic transmission portion 20 so as to establish the target gear position of a jump shift-down action in a length of time as short as possible. The control routine is repeatedly executed with an extremely short cycle time of about several milliseconds to about several tens of milliseconds, during running of the vehicle in the engine-drive mode.

Figure 8:
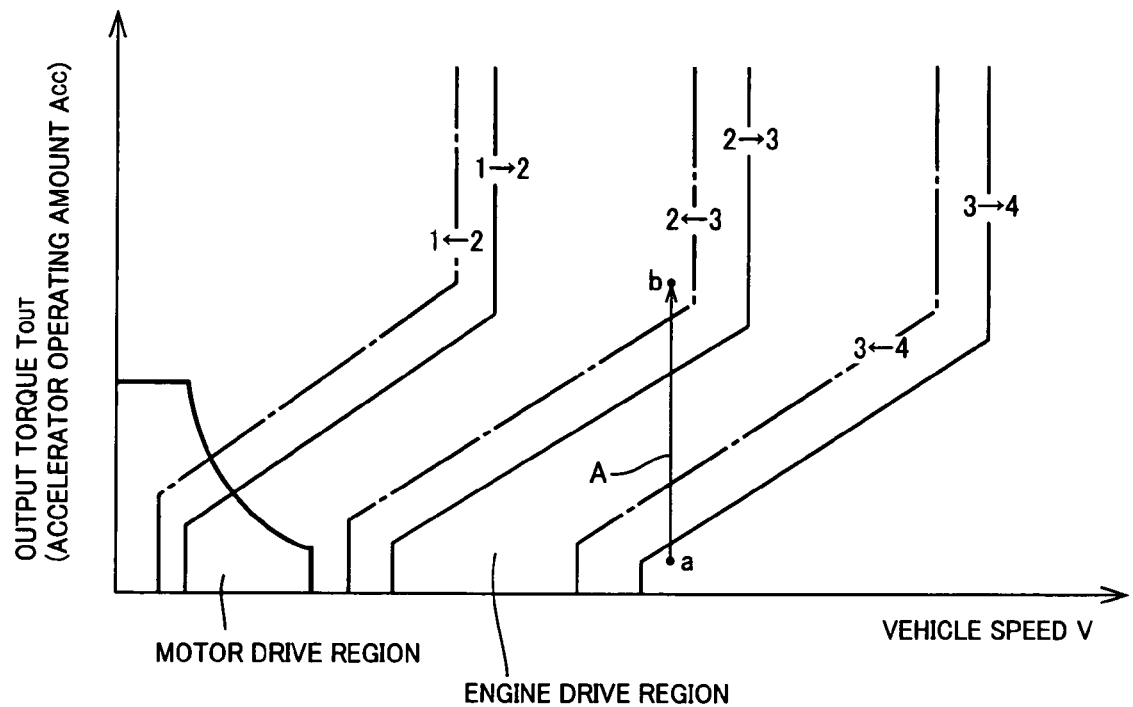
FIG. 8 is a view illustrating an example of a stored shifting boundary line map used for determining a shifting action of the automatic transmission portion, and an example of a stored drive-power-source switching boundary line map used for switching a vehicle drive mode between an engine drive mode and a motor drive mode, the shifting and switching boundary line maps being defined in the same two-dimensional coordinate system, in relation to each other, with a vehicle speed and a required vehicle output torque being respectively taken along horizontal and vertical axes of the coordinate system.

The control routine is initiated with step SA1 corresponding to the shifting-action determining portion 86, to make the determination as to whether a jump shift-down action of the automatic transmission portion 20 should take place. The determination is made on the basis of the vehicle speed V and the accelerator pedal operation amount $A_{CC}$ and according to the shifting boundary line map as indicated in FIG. 8 by way of example. When the shifting-action determining portion 86 determines that a jump shift-down action should take place, that is, when an affirmative determination is obtained in the step SA1, the control flow goes to step SA2. When a negative determination is obtained in the step SA1, that is, when the shifting-action determining portion 86 does not determine that a jump-shift-down action of the automatic transmission 20 should take place, one cycle of execution of the present control routine is terminated. The jump shift-down action is a single shift-down action to from the present gear position to the target gear position while skipping at least one intermediate gear position between the present and target gear positions. Namely, the shift-down action is determined to be a jump shift-down action when the present gear position and the target gear position to be established by the shift-down action satisfy an equation (1) indicated below. When the accelerator pedal is abruptly depressed to rapidly increase the operation amount ACC from the point "a" to the point "b" as indicated by the arrow-headed solid straight line A in FIG. 8, while the automatic transmission portion 20 is presently placed in the fourth gear position, the shifting-action determining portion 86 determines that a jump shift-down action from the fourth gear position to the second gear position (target gear position) should take place. In this case, the following equation (1) is satisfied.

Numerical value of the present gear position−2≧numerical value of the target gear position (1)

In the step SA2 corresponding to the shifting inhibiting portion 88, the predetermined lower limit $N1_E$ of the engine speed $N_E$ corresponding to the target gear position of the jump shift-down action in question is selected from the stored values, and the determination as to whether the engine speed $N_E$ is lower than the lower limit $N1_E$. If the shifting inhibiting portion 88 determines that the engine speed $N_E$ is lower than the lower limit $N1_E$, the jump shift-down action is inhibited. If the shifting inhibiting portion 88 does not determine that the engine speed $N_E$ is lower than the lower limit $N1_E$, the jump shift-down action is not inhibited and is permitted to be performed.

If an affirmative determination is obtained in the step SA2, that is, if the jump shift-down action is inhibited by the shifting inhibiting portion 88, the control flow goes to step SA3. If a negative determination is obtained in the step SA2, that is, if the jump shift-down action is not inhibited by the shifting inhibiting portion 88, the control flow goes to step SA6.

In the step SA3 corresponding to the shifting-inhibiting-time estimating portion 90, the jump-shift-down-action inhibiting time $T2_A$ from the moment of determination of the jump shift-down action in the step SA1 to the moment at which the inhibition of the jump shift-down action should be released or canceled (at which the negative determination is obtained in the step SA2) is estimated on the basis of a change of the engine speed $N_E$, more precisely, on the basis of the rate of rise $A_E$ of the engine speed $N_E$. Described in detail, the engine speed $N_E$ is detected from time to time to determine the rate of rise $A_E$ of the engine speed $N_E$, and the estimated length of time to the moment at which the engine speed $N_E$ is raised at the determined rate of rise $A_E$ to the lower limit $N1_E$ corresponding to the target gear position to be established by the jump shift-down action in question is calculated as the jump-shift-down-action inhibiting time $T2_A$.

Where the sequential shift-down operation to the target gear position of the jump shift-down action is also inhibited, the sequential-shift-down-operation inhibiting time $T1_A$ from the moment of determination of the jump shift-down action in the step SA1 to the moment at which the inhibition of the sequential shift-down operation should be released or canceled is estimated on the basis of the rate of rise $A_E$ of the engine speed $N_E$. The step SA3 is followed by step SA4.

In the step SA4 corresponding to the shifting-time comparing portion 92, the total sequential-shift-down-operation time $T1_T$ is obtained by adding the sequential-shift-down-operation inhibiting time $T1_A$ to the required net sequential-shift-down-operation time $T1_{EX}$, and the total jump-shift-down-action time $T2_T$ is obtained by adding the jump-shift-down-action inhibiting time $T2_A$ to the required net jump-shift-down-action time $T2_{EX}$. Where the sequential shift-down operation is not inhibited, that is, where the sequential-shift-down-operation inhibiting time $T1_A$ is zero, the required net sequential-shift-down-operation time $T1_{EX}$ is determined as the total sequential-shift-down-operation time $T1_T$. The total sequential-shift-down-operation time $T1_T$ and the total jump-shift-down-action time $T2_T$ are compared to each other, to determine whether the total sequential-shift-down-operation time $T1_T$ is equal to or shorter than the total jump-shift-down-action time $T2_T$. If the affirmative determination is obtained in the step SA4, that is, if the total sequential-shift-down-operation time $T1_T$ is equal to or shorter than the total jump-shift-down-action time $T2_T$, the control flow goes to step SA5. If the negative determination is obtained in the step SA4, the control flow goes to step SA6.

In the step SA5 corresponding to the step-variable shifting control portion (shift control portion) 82, the shifting command to perform the sequential shift-down operation to place the automatic transmission portion 20 in the target gear position of the jump shift-down action is generated, unless the first shift-down action of the sequential shift-down operation is inhibited. Namely, where the sequential shift-down operation is inhibited, this sequential shift-down operation is initiated after the first shift-down action of the sequential shift-down operation is permitted.

In the step also corresponding to the step-variable shifting control portion 82, the shifting command to perform the jump shift-down action is generated after the inhibition of this jump shift-down action is canceled, that is, after the jump shift-down action to the target gear position is permitted, namely, after the negative determination is obtained in the step SA2.

Referring next to the time chart of FIG. 12, there will be described a shift control pattern (1) in which the sequential shift-down operation from the fourth gear position to the second gear position through the intermediate third gear position is performed, and a shift control pattern (2) in which the jump shift-down action from the fourth gear position directly to the second gear position while skipping the intermediate third gear position is performed. In the specific example illustrated in the time chart of FIG. 12, the jump shift-down action according to the shift control pattern (2) is completed in a shorter length of time than the sequential shift-down operation according to the shift control pattern (1), the automatic transmission 20 is controlled by the step-variable shifting control portion 82 according to the shift control pattern (2), that is, the automatic transmission portion 20 is controlled to perform the jump shift-down action from the fourth gear position to the target second gear position. The time chart of FIG. 12 indicates the accelerator pedal operation amount $A_{CC}$, the engine speed $N_E$, the shift control pattern (1) and the shift control pattern (2), in the order of description from the top toward the bottom. At the position of the engine speed $N_E$ in the time chart of FIG. 12, there are indicated, by broken lines, the lower engine speed limit $N1_E$ determined for the target second gear position (hereinafter referred to as "target $2^{nd}$-gear-position lower engine-speed limit $N1_{E-2}$"), and the lower engine speed limit $N1_E$ determined for the target third gear position (hereinafter referred to as "target $3^{rd}$-gear-position lower engine-speed limit $N1_{E-3}$"). At the position of the engine speed $N_E$, there are also indicated: an engine-speed range (a) not lower than the target $2^{nd}$-gear-position lower engine-speed limit $N1_{E-2}$, in which the shift-down action to the second gear position is permitted; an engine-speed range (c) lower than the target $3^{rd}$-gear-position lower engine-speed limit $N1_{E-3}$, in which the shift-down actions to the third and second gear positions are inhibited; and an engine-speed range (b) between the target $2^{nd}$-gear-position lower engine-speed limit $N1_{E-2}$ and the target $3^{rd}$-gear-position lower engine-speed limit $N1_{E-3}$, in which the shift-down action to the third gear position is permitted, while the shift-down action to the second gear position is inhibited.

Figure 11:
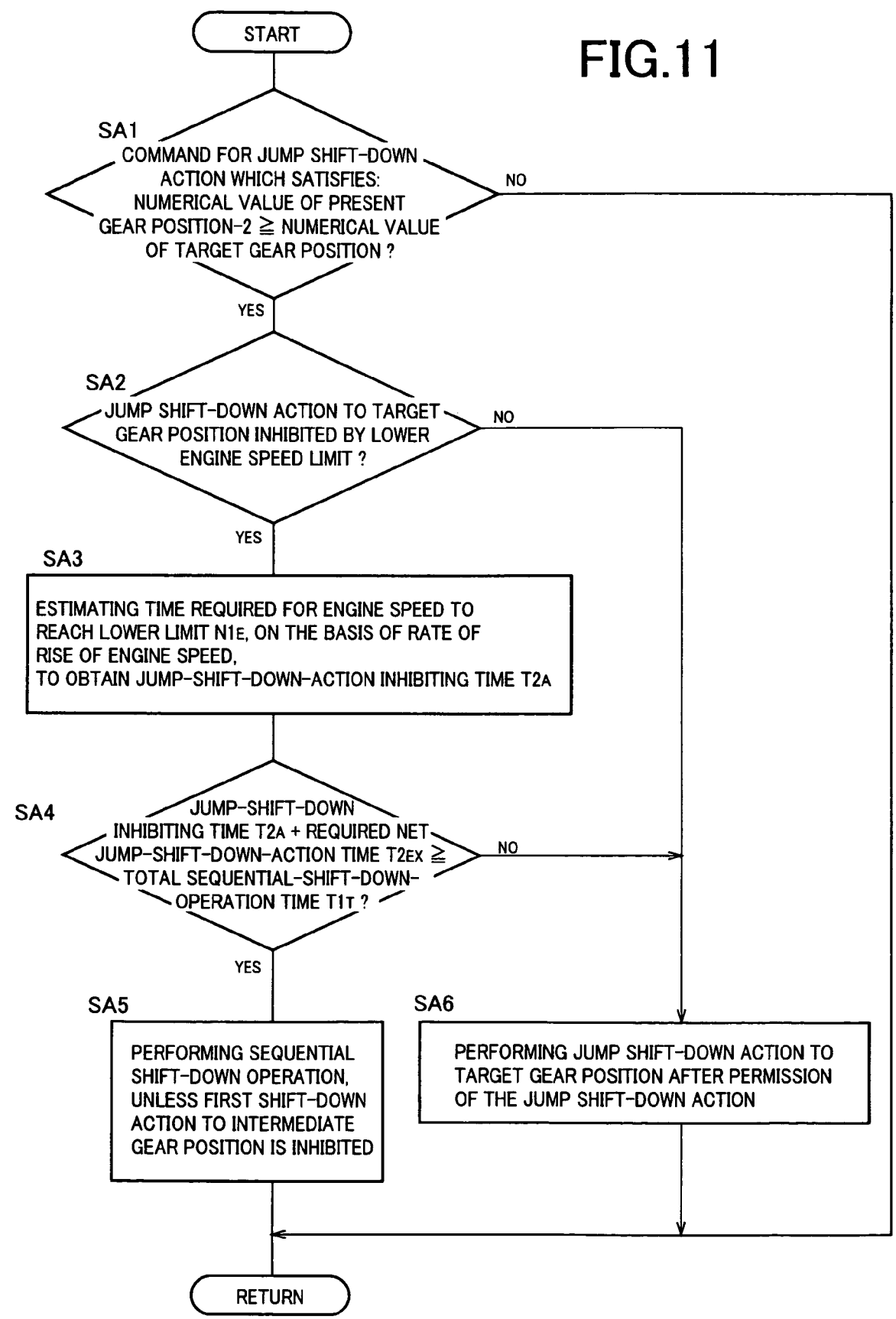
FIG. 11 is a flow chart illustrating a control routine executed by the electronic control device of FIG. 4 to control the automatic transmission portion so as to establish the target gear position of a jump shift-down action in a length of time as short as possible.
Figure 12:
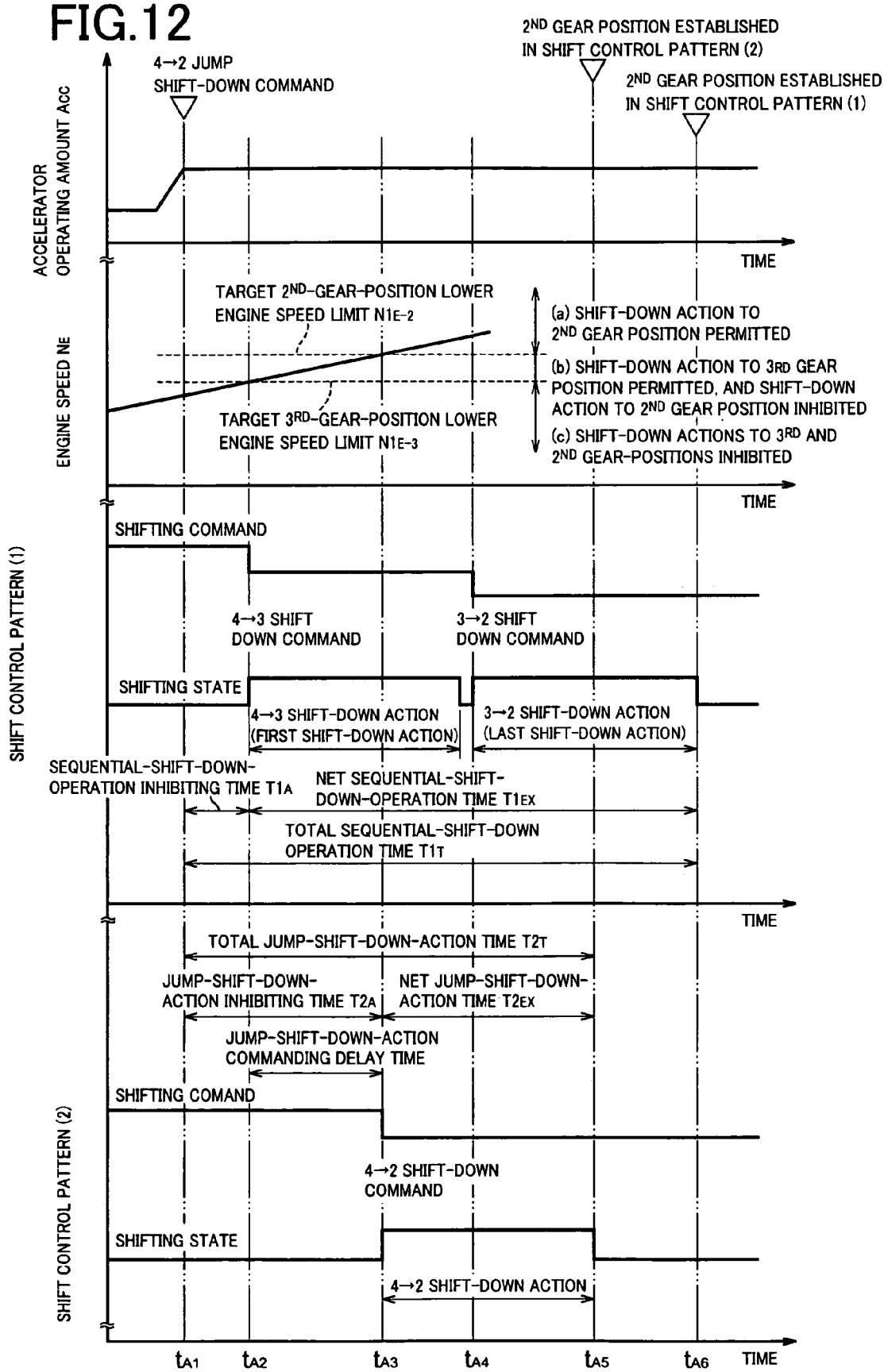
FIG. 12 is a time chart for explaining a jump shift-down action of the automatic transmission portion from the fourth gear position to the second gear position, in comparison with a sequential shift-down operation of the automatic transmission portion wherein a shift-down action from the fourth gear position to the third gear position and a shift-down action from the third gear position to the target second gear position are sequentially or successively performed such that the second shift-down action to the target second gear position is initiated after the first shift-down action to the intermediate third gear position is completed.

At a point of time $t_{41}$ in FIG. 12, the shifting command to perform the jump shift-down action of the automatic transmission portion 20 from the present fourth gear position to the target second gear position is generated as a result of abrupt depression of the accelerator pedal to rapidly increase the operation amount $A_{CC}$. Accordingly, the affirmative determination is obtained in the step SA1 of the control routine of the flow chart of FIG. 11 at the point of time $t_{41}$. At this point of time $t_{41}$, the engine speed $N_E$ is in the process of rising, but is still lower than the target $3^{rd}$-gear-position lower engine-speed limit $N1_{E-3}$, so that the shift-down actions to the third and second gear positions are inhibited. Accordingly, the affirmative determination is obtained in the step SA2 at the point of time $t_{A1}$.

At a point of time $t_{A2}$ in FIG. 12, the engine speed $N_E$ has been raised to the target $3^{rd}$-gear-position lower engine speed limit $N1_{E-3}$, so that the inhibition of the shift-down action to the third gear position is canceled, that is, the shift-down action to the third gear position is permitted. If the automatic transmission portion 20 were controlled according to the shift control pattern (1), the shifting command to perform the shift-down action from the present fourth gear position to the third gear position would be applied to the hydraulic control unit 70 at the point of time $t_{A2}$, so that the first shift-down action from the fourth gear position to the third gear position is performed according to the shift control pattern (1) to initiate the sequential shift-down operation at the point of time $t_{A2}$. Since the engine speed $N_E$ is still lower than the target $2^{nd}$-gear-position lower engine speed limit $N1_{E-2}$, at the point of time $t_{A2}$, the second shift-down action from the third gear position to the target second gear position according to the shift control pattern (1) is inhibited, and the jump shift-down action according to the shift control pattern (2) is also inhibited.

At a point of time $t_{A3}$ in FIG. 12, the engine speed $N_E$ has been raised to the target $2^{nd}$-gear-position lower engine speed limit $N1_{E-2}$, so that the inhibition of the second shift-down action to the target second gear position according to the shift control pattern (1) and the jump shift-down action according to the shift control pattern (2) are canceled, that is, the shift-down actions to the target second position are permitted. According to the shift control pattern (2), the shifting command to perform the jump shift-down action from the present fourth gear position to the target second gear position is applied to the hydraulic control unit 70 at the point of time $t_{A3}$, so that the jump shift-down action from the fourth gear position to the target second gear position is initiated at the point of time $t_{A3}$.

At a point of time $t_{A4}$ in FIG. 12, the inhibition of the second shift-down action to the second gear position according to the shift control pattern (1) has already been canceled, and the first shift-down action from the fourth gear position to the third gear position is completed, so that the shifting command to perform the second shift-down action from the third gear position to the target second gear position is applied to the hydraulic control unit 70. Accordingly, the second or last shift-down action from the third gear position to the target second gear position is initiated at the point of time $t_{A4}$.

At a point of time $t_{A5}$ in FIG. 12, the jump shift-down action from the fourth gear position to the target second gear position according to the shift control pattern (2) is completed, so that the target second gear position has been established.

At a point of time $t_{A6}$ in FIG. 12, the second or last shift-down action according to the shift control pattern (1) is completed, so that the target second gear position has been established.

As indicated in the time chart of FIG. 12, the length of time from the point of time $t_{A1}$ to the point of time $t_{A2}$ is the sequential-shift-down-operation inhibiting time $T1_A$, and the length of time from the point of time $t_{A2}$ to the point of time $t_{A6}$ is the required net sequential-shift-down-operation time $T1_{EX}$, while the length of time from the point of time $t_{A1}$ to the point of time $t_{A6}$ is the total sequential-shift-down-operation time $T1_T$. Further, the length of time from the point of time $t_{A1}$ to the point of time $t_{A3}$ is the jump-shift-down-action inhibiting time $T2_A$, and the length of time from the point of time $t_{A3}$ to the point of time $t_{A5}$ is the required net jump-shift-down-action time $T2_{EX}$, while the length of time from the point of time $t_{A1}$ to the point of time $t_{A5}$ is the total jump-shift-down-action time $T2_T$. The length of time from the point of time $t_{A2}$ to the point of time $t_{A3}$ is a jump-shift-down-action commanding delay time by which the moment of initiation of the jump shift-down action to the target second gear position is delayed with respect to the moment of initiation of the sequential shift-down operation. The required net jump-shift-down-action time $T2_{EX}$ is a length of time required for performing one clutch-to-clutch jump or skipping shift-down action, while on the other hand the required net sequential-shift-down-operation time $T1_{EX}$ is a length of time required for performing two sequential or successive clutch-to-clutch shift-down actions, so that the required net jump-shift-down-action time $T2_{EX}$ is shorter than the required net sequential-shift-down-operation time $T1_{EX}$.

As described above, the affirmative determination is obtained in the step SA2 of the flow chart of FIG. 11 at the point of time $t_{A1}$, and thereafter the sequential-shift-down-operation inhibiting time $T1_A$ and jump-shift-down-action inhibiting time $T2_A$ indicated in FIG. 12 are estimated in the step SA3. Then, in the step SA4, the total sequential-shift-down-operation time $T1_T$ and the total jump-shift-down-action time $T2_T$ are compared with each other. As a result of determination that the total jump-shift-down-action time $T2_T$ according to the shift control pattern (2) is shorter than the total sequential-shift-down-operation time $T1_T$ according to the shift control pattern (1), the negative determination is obtained in the step SA4, so that the jump shift-down action is performed in the step SA6 according to the shift control pattern (2). In the shift control pattern (2), the target second gear position is established at an earlier point of time (tA5) than in the shift control pattern (1), although the jump shift-down action is initiated at the point of time $t_{A3}$, which is subsequent to the point of time $t_{A2}$ at which the sequential shift-down operation (first shift-down action from the fourth gear position to the third gear position) is initiated.

According to the control apparatus in the form of the electronic control device 80 constructed according to the illustrated embodiment described above, the shifting-time comparing portion 92 is operated upon determination by the shifting-action determining portion 86 that the jump shift-down action should take place, and upon inhibition of the jump shift-down action by the shifting inhibiting portion 88, to compare the total sequential-shift-down-operation time $T1_T$ required for the sequential shift-down operation with the total jump-shift-down-action time $T2_T$ required for the jump shift-down action to be performed after the inhibition of the jump shift-down action by the shifting inhibiting portion 88 is canceled. Further, the shift control portion 82 is operated upon the determination by the shifting-action determining portion 86 that the jump shift-down action should take place and upon the inhibition of the jump shift-down action by the shifting inhibiting portion 88, to generate the shifting command to perform the jump shift-down action when the total jump-shift-down-action time $T2_T$ is shorter than the total sequential-shift-down-operation time $T1_T$, and the shifting command to perform the sequential shift-down operation when the total jump-shift-down-action time $T2_T$ is not shorter than the total sequential-shift-down-operation time $T1_T$. Thus, the present control apparatus is configured such that one of the sequential shift-down operation and the jump shift-down action which is completed at an earlier point of time is performed, when it is determined that the jump shift-down action should take place and when this jump shift-down action is initially inhibited. Accordingly, the present control apparatus assures a higher degree of shifting control response of the automatic transmission portion 20 upon determination that the jump shift-down action of the automatic transmission portion 20 should take place, than in the prior art shifting control wherein the sequential shift-down operation is always performed when the jump shift-down action is inhibited.

The present embodiment is further configured to obtain the total sequential-shift-down-operation time $T1_T$, which is the length of time from the moment of determination that the jump shift-down action should take place, to the moment at which the sequential shift-down operation is completed, and the total jump-shift-down-action time $T2_T$, which is the length of time from the above-indicated moment of determination to the moment at which the jump shift-down action is completed. Accordingly, the shifting-time comparing portion 92 can determine which one of the sequential shift-down operation and the jump shift-down action is completed at an earlier point of time, by comparing the total sequential-shift-down-operation time and the total jump shift-down-action time.

The present embodiment is further configured such that the shifting-inhibiting-time estimating portion 90 is operated, upon determination by the shifting-action determining portion 86 that the jump shift-down action should take place and upon inhibition of the jump shift-down action by the shifting inhibiting portion 88, to estimate, on the rate of rise $A_E$ of the engine speed $N_E$, the jump-shift-down-action inhibiting time $T2_A$ which is the length of time from the moment of determination that the jump shift-down action should take place, to the moment at which inhibition of the jump shift-down action by the shifting inhibiting portion 88 is canceled. Further, the shifting-time comparing portion 92 determines, as the total jump-shift-down-action time $T2_T$, a sum of the jump-shift-down-action inhibiting time $T2_A$ estimated by the shifting-inhibiting-time estimating portion 90, and the required net jump-shift-down-action time $T2_{EX}$ stored therein. Accordingly, the total jump-shift-down-action time $T2_T$ can be easily obtained by detecting the engine speed $N_E$ from time to time.

The present embodiment is further configured such that the predetermined lower limit $N1_E$ of the engine speed $N_E$ is determined by experimentation, for each of the target gear positions to be established by the shift-down actions (including the jump shift-down actions) of the automatic transmission portion 20, and the thus determined lower limit values $N1_E$ are stored in the shifting inhibiting portion 88. The lower limit values $N1_E$ are determined to prevent a rise of the absolute value of the first electric motor speed $N_{M1}$ above the permissible highest value $N1_{M1}$, such that the lower limit values increase with an increase of the speed ratios of the gear positions to be established by and after the shift-down actions to be inhibited by the shifting-action inhibiting portion 88. Accordingly, the durability of the first electric motor M1 can be maintained while preventing an excessive rise of the first electric motor speed $N_{M1}$ due to the shift-down actions of the automatic transmission portion 20.

While the preferred embodiment of this invention has been described in detail by reference to the accompanying drawings, for illustrative purpose only, it is to be understood that the present invention may be embodied with various changes and improvements, which may occur to those skilled in the art without departing from the spirit and scope of this invention.

In the illustrated embodiment, the total sequential-shift-down-operation time $T1_T$ is the length of time from the moment of determination that the jump shift-down action should take place, to the moment at which the sequential shift-down operation is completed, while the total jump-shift-down-action time $T2_T$ is the length of time from the moment of determination that the jump shift-down action should take place, to the moment at which the jump shift-down action is completed. However, the total sequential-shift-down-operation time $T1_T$ and total jump-shift-down-action time $T2_T$ need not start at the moment of determination that the jump shift-down action should take place, that is, at the point of time $T_{A1}$, but may start at any other same point of time, for instance, at the point of time $T_{A2}$ at which the inhibition of the first shift-down action of the sequential shift-down operation is canceled. In this case, the sequential-shift-down-operation inhibiting time $T1_A$ is zero, while the jump-shift-down-action inhibiting time $T2_A$ is a length of time from the moment at which the inhibition of the first shift-down action of the sequential shift-down operation is canceled, to the moment at which the inhibition of the jump shift-down action by the shifting inhibiting portion 88 is canceled.

While the illustrated embodiment has been described in connection with the jump shift-down action from the fourth gear position to the second gear position, which is required to take place according to the determination by the shifting-action determining portion 86, the principle of the present invention is equally applicable to any other jump shift-down action while skipping at least one intermediate gear position, for example, the jump shift-down action from the third gear position to the first gear position, and a jump shift-down action from the present gear position to the target gear position while skipping at least two intermediate gear positions, for example, the jump shift-down action from the fourth gear position to the first gear position while skipping the third and second gear positions.

While the illustrated power transmitting system 10 is provided with the second electric motor M2, the power transmitting system 10 need not be provided with the second electric motor M2.

Although the second electric motor M2 is connected directly to the power transmitting member 18, the second electric motor M2 may be connected to any portion of the power transmitting path between the engine 8 or power transmitting member 18 and the drive wheels 34, either directly or indirectly through a suitable power transmitting device such as a transmission, a planetary gear device and a coupling device.

Although the differential portion 11 of the illustrated power transmitting system 10 functions as an electrically controlled continuously variable transmission the gear ratio $\gamma 0$ of which is continuously variable from the minimum value $\gamma 0_{min}$ to the maximum value $\gamma 0_{max}$, the differential portion 11 may be modified such that its speed ratio $\gamma 0$ is not variable continuously, but is variable in steps by utilizing its differential function. The present invention is applicable to a vehicular power transmitting system including the differential portion modified as described above.

The differential portion 11 may be provided with a differential limiting device disposed in the power distributing mechanism 16 to limit the differential function of the differential portion 11 so that the differential portion 11 is operable as a step-variable transmission having two forward-drive gear positions.

In the power distributing mechanism 16 in the illustrated power transmitting system 10, the carrier CA0 is fixed to the engine 8, and the sun gear S0 is fixed to the first electric motor M1 while the ring gear R0 is fixed to the power transmitting member 18. However, this arrangement is not essential. The engine 8, first electric motor M1 and power transmitting member 18 may be fixed to any other elements selected from the three elements CA0, S0 and R0 of the planetary gear set 24.

While the engine 8 is directly fixed to the input shaft 14 in the illustrated power transmitting system, the engine 8 may be operatively connected to the input shaft 14 through any suitable member such as gears and a belt, and need not be disposed coaxially with the input shaft 14.

In the illustrated power transmitting system 10, the first electric motor M1 and the second electric motor M2 are disposed coaxially with the input shaft 14, and the first electric motor M1 is connected to the sun gear S0 of the differential portion 11 while the second electric motor M2 is connected to the power transmitting member 18. However, this arrangement is not essential. For instance, the first and second electric motors M1, M2 may be respectively connected to the sun gear S0 and the power transmitting member, through gears, belts or speed reducing devices.

The hydraulically operated frictional coupling devices such as the first and second clutches C1, C2 used in the illustrated power transmitting system 10 may be replaced by magnetic-power type, electromagnetic type or mechanical type coupling devices such as power clutches, electromagnetic clutches and meshing type dog clutches. Where the electromagnetic clutches are used, the hydraulic control unit 70 incorporating valve devices is replaced by an electric switching device or an electromagnetic switching device operable to control command signals to be applied to the electromagnetic clutches.

In the illustrated power transmitting system 10, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

The power distributing mechanism 16 provided as the differential mechanism may be replaced by a differential gear device including a pinion rotated by the engine 8, and a pair of bevel gears which meshes with the pinion and which is operatively connected to the first electric motor M2 and the power transmitting member 18 (second electric motor M2).

While the engine 8 and the differential portion 11 are connected directly to each other in the illustrated power transmitting system 10, the engine 8 and the differential portion 11 need not be connected directly to each other. For instance, a clutch may be interposed between the engine 8 and the differential portion 11.

In the illustrated power transmitting system 10, the differential portion 11 and the automatic transmission portion 20 are connected in series to each other. However, the control apparatus according to the present invention is equally applicable to a power transmitting system in which an electrically controlled differential portion and a step-variable transmission portion are not mechanically independent of each other, provided the power transmitting system as a whole has an electric differential function, and a shifting function different from the electric differential function. Further, the electrically controlled differential portion and the step-variable transmission portion may be suitably disposed in a desired order in the drive system. Namely, the automatic transmission portion 20 is required to constitute a part of the power transmitting path between the engine 8 and the drive wheels 34.

While the power distributing mechanism 16 in the illustrated power transmitting system 10 is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two or more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

In the illustrated power transmitting system 10, the first electric motor M1 and the second rotary element RE2 are connected directly to each other, while the second electric motor M2 and the third rotary element RE3 are connected directly to each other. However, the first electric motor M1 may be connected to the second rotary element RE2 through a clutch or any other coupling element, while the second electric motor M2 may be connected to the third rotary element RE3 through a clutch or any other coupling element.

In the illustrated power transmitting system 10, the second electric motor M2 is connected to the power transmitting member 18 which constitutes a part of the power transmitting path between the engine 8 and the drive wheels 34. However, the second electric motor M2 which is connected to the above-indicated power transmitting path (power transmitting member 18) may be connectable to the power distributing mechanism 16 through a clutch or any other coupling device, so that the differential state of the power distributing mechanism 16 can be controlled by controlling the operating state of the second electric motor M2 rather than the first electric motor M1.

In the illustrated power transmitting system 10, the automatic transmission portion 20 is a transmission portion functioning as a step-variable automatic transmission. However, the automatic transmission portion 20 may be replaced by a continuously-variable transmission (CVT).

In the illustrated power transmitting system 10, the differential portion 11 is provided with the first and second electric motors M1, M2. However, the first and second electric motors M1, M2 may be provided in the power transmitting system 10, such that the motors M1, M2 are disposed outside or separately from the differential portion 11.

What is claimed is:

1. A control apparatus for a vehicular power transmitting system including (a) an electrically controlled differential portion having a differential mechanism disposed between an engine and a drive wheel, and a differential-portion electric motor operatively connected to the differential mechanism, wherein a differential state of the differential portion is controllable by controlling an operating state of the differential-portion electric motor, and (b) a step-variable automatic transmission portion which constitutes a part of a power transmitting path between the engine and the drive wheel, said control apparatus comprising:

a shifting-action determining portion configured to determine whether a shifting action of the automatic transmission portion should take place;

a shifting inhibiting portion configured to inhibit a shift-down action of the automatic transmission portion when an operating speed of the engine is lower than a predetermined lower limit;

a shifting-time comparing portion operable when said shifting-action determining portion determines that a jump shift-down action of the automatic transmission portion from a present gear position to a target gear position while skipping at least one intermediate gear position therebetween should take place, and when said jump shift-down action is inhibited by said shifting inhibiting portion, said shifting-time comparing portion being configured to compare a total sequential-shift-down-operation time required for a sequential shift-down operation consisting a shift-down action from the present gear position to each of said at least one intermediate gear position and a last shift-down action from the last intermediate gear position to said target gear position, with a total jump-shift-down-action time required for said jump shift-down action to be performed after the inhibition of said jump shift-down action is canceled; and a shift control portion operable when said shifting-action determining portion determines that said jump shift-down action should take place and when said jump shift-down action is inhibited, said shift control portion being configured to generate a shifting command to perform said jump shift-down action when said total jump-shift-down-action time is shorter than said total sequential-shift-down-operation time, and a shifting command to perform said sequential shift-down operation when said total jump-shift-down-action time is not shorter than said total sequential-shift-down-operation time.

2. The control apparatus according to claim 1, wherein said total sequential-shift-down-operation time is a length of time from a moment of determination that said jump shift-down action should take place, to a moment at which said sequential shift-down operation is completed, while said total jump-shift-down-action time is a length of time from said moment of determination to a moment at which said jump shift-down action is completed.

3. The control apparatus according to claim 1, further comprising a shifting-inhibiting-time estimating portion operable when said shifting-action determining portion determines that said jump shift-down action should take place and when said jump shift-down action is inhibited by said shifting inhibiting portion, said shifting-inhibiting-time estimating portion being configured to estimate, on a basis of a change of an operating speed of said engine, a jump-shift-down-action inhibiting time from a moment of determination that said jump shift-down action should take place, to a moment at which inhibition of said jump shift-down action by said shifting inhibiting portion is canceled, and wherein said shifting-time comparing portion determines a sum of said jump-shift-down-action inhibiting time and a length of time from a moment of initiation of said jump shift-down action to a moment of completion of said jump shift-down action, as said total jump-shift-down-action time.

4. The control apparatus according to claim 1, wherein said predetermined lower limit of the operating speed of the engine is determined to prevent a rise of an absolute value of the operating speed of said differential-portion electric motor above a permissible highest value, such that the lower limit increases with an increase of a speed ratio of the gear position to be established by and after said shifting action to be inhibited by said shifting-action inhibiting portion.

* * * * *